(12) United States Patent
Jeong et al.

(10) Patent No.: US 12,339,468 B2
(45) Date of Patent: Jun. 24, 2025

(54) LENS STRUCTURE AND MANUFACTURING METHOD THEREOF

(71) Applicant: KOREA ADVANCED INSTITUTE OF SCIENCE AND TECHNOLOGY, Daejeon (KR)

(72) Inventors: Ki-Hun Jeong, Daejeon (KR); Sangin Bae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 840 days.

(21) Appl. No.: 17/405,634

(22) Filed: Aug. 18, 2021

(65) Prior Publication Data

US 2022/0057545 A1 Feb. 24, 2022

(30) Foreign Application Priority Data

Aug. 20, 2020 (KR) .................. 10-2020-0104405

(51) Int. Cl.
*G02B 3/00* (2006.01)
*G02B 5/00* (2006.01)
*G02B 5/08* (2006.01)

(52) U.S. Cl.
CPC ......... *G02B 3/0037* (2013.01); *G02B 3/0018* (2013.01); *G02B 5/003* (2013.01); *G02B 5/0875* (2013.01)

(58) Field of Classification Search
CPC .... G02B 3/0037; G02B 5/003; G02B 5/0875; G02B 3/0018
See application file for complete search history.

(56) References Cited

U.S. PATENT DOCUMENTS

| 2014/0176570 A1* | 6/2014 | Shi | G02B 5/003 |
| | | | 438/57 |
| 2015/0003220 A1* | 1/2015 | Peng | G11B 5/314 |
| | | | 369/13.32 |
| 2019/0312072 A1* | 10/2019 | Cho | H01L 27/14627 |

FOREIGN PATENT DOCUMENTS

| JP | H07239411 A | 9/1995 |
| JP | 2019197123 A | 11/2019 |
| KR | 20090033725 A | 4/2009 |
| KR | 20150100774 A | 9/2015 |
| KR | 20190116026 A | 10/2019 |

OTHER PUBLICATIONS

Korean Notice of Allowance issued in corresponding Korean Patent Application No. 10-2020-0104405, dated Jul. 17, 2022, pp. 1-5.
Korean Office Action issued in corresponding Korean Application No. 10-2020-0104405, dated Jan. 12, 2022, pp. 1-5.

* cited by examiner

*Primary Examiner* — Ephrem Z Mebrahtu
(74) *Attorney, Agent, or Firm* — Hauptman Ham, LLP

(57) ABSTRACT

Provided are a lens structure capable of increasing a light absorbance and reducing optical crosstalk by manufacturing a multilayered aperture having a form of a metal layer-dielectric layer-metal layer stacked in a vertical direction and pore patterns formed on both metal layers as an aperture of a microlens array, and a manufacturing method thereof.

9 Claims, 13 Drawing Sheets

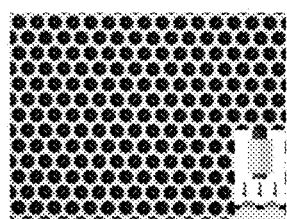 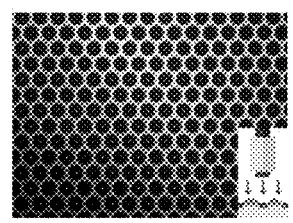 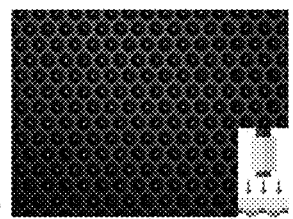
FIG. 9A     FIG. 9B     FIG. 9C
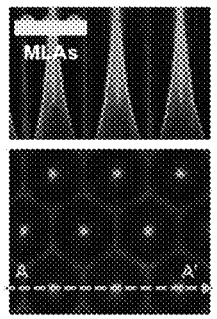 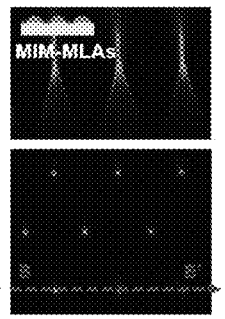 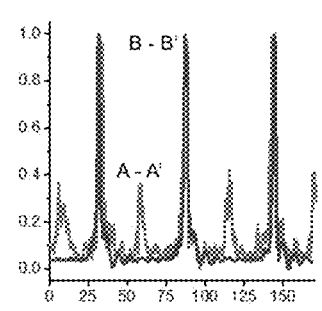
FIG. 9D     FIG. 9E     FIG. 9F

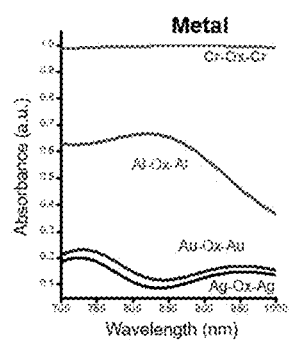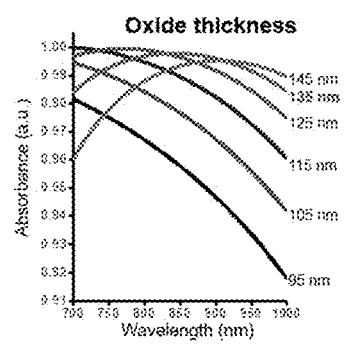
FIG. 11A  FIG. 11B
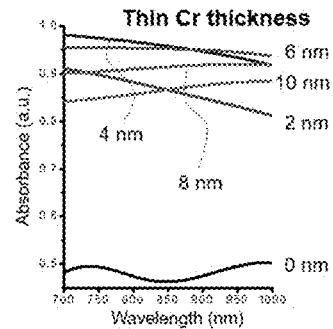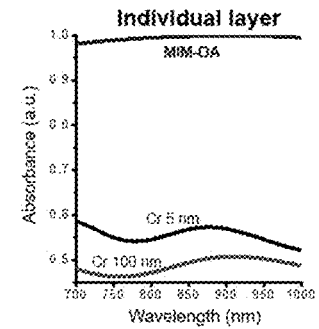
FIG. 11C  FIG. 11D

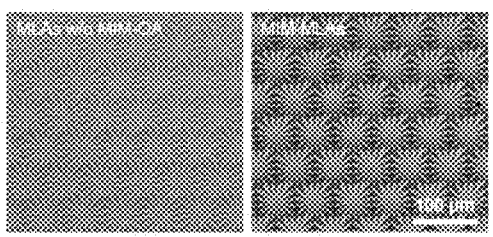 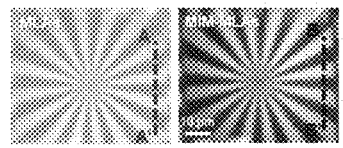
FIG. 13A                    FIG. 13B
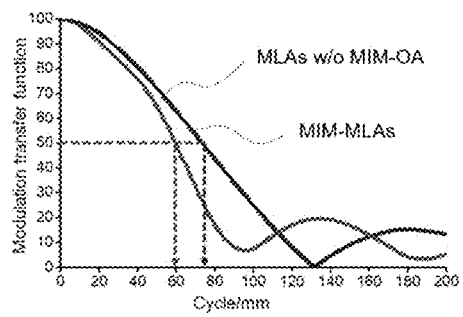 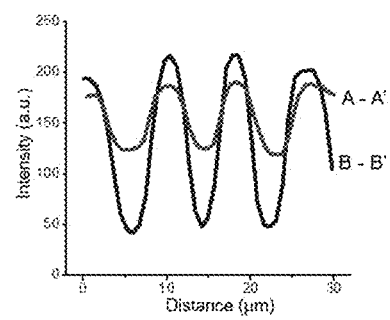
FIG. 13C                    FIG. 13D

LENS STRUCTURE AND MANUFACTURING METHOD THEREOF

CROSS-REFERENCE TO RELATED APPLICATIONS

This application claims priority under 35 U.S.C. § 119 to Korean Patent Application No. 10-2020-0104405, filed on Aug. 20, 2020, in the Korean Intellectual Property Office, the disclosure of which is incorporated herein by reference in its entirety.

TECHNICAL FIELD

The following disclosure relates to a lens structure capable of increasing a light absorbance and reducing optical crosstalk by manufacturing a multilayered aperture having a form of a metal layer-dielectric layer-metal layer stacked in a vertical direction and pore patterns formed on both metal layers as an aperture of a microlens array, and a manufacturing method thereof.

BACKGROUND

With the development of display technologies used in portable terminals, projectors, and TVs currently on the market, it is possible to provide not only high-resolution screens but also virtual screens or 3D images. In order to implement such a projection, virtual screen, or 3D image on various electronic devices, it is essential to use a microlens array (MLA) designed to be suitable for each purpose.

The microlens array is formed by forming a plurality of microlenses having a diameter of 1 mm or less in a matrix shape, and has a shape in which a plurality of microlenses protruding in a substantially hemispherical shape are collocated in longitudinal and lateral directions on one surface.

Such a microlens array has advantages of effectively focusing light due to a short effective focal length, making an optical system in a subminiature size, and having a wide angle of view when manufactured in a curved shape as it may be manufactured to be thinner than a conventional general lens.

However, in such a microlens array, light passing through one lens overlaps with light coming from another lens between adjacent microlenses, which may cause optical crosstalk. Accordingly, there is a demand for measures to prevent the crosstalk phenomenon.

RELATED ART DOCUMENT

Patent Document

Korean Patent Laid-Open Publication No. 10-2009-0033725 (2009 Apr. 6.)

SUMMARY

An embodiment of the present invention is to provide a lens structure capable of increasing a light absorbance and reducing optical crosstalk by manufacturing a multilayered aperture having a form of a metal layer-dielectric layer-metal layer and pore patterns formed on both metal layers as an aperture of a microlens array, and a manufacturing method thereof.

In one general aspect, a lens structure includes a multilayered aperture having a form of a metal layer-dielectric layer-metal layer stacked in a vertical direction and having pore patterns formed on both metal layers; and a microlens array provided on one side surface of the multilayered aperture.

The multilayered aperture may include a first metal layer having a first pore pattern; a dielectric layer disposed on the first metal layer; and a second metal layer disposed on the dielectric layer and having a second pore pattern aligned with the first pore pattern in a row.

The microlens array may be formed to include a plurality of microlenses provided on each pore of the second metal layer.

The first metal layer may be formed on a substrate, and the second metal layer may have a thickness smaller than that of the first metal layer.

The second metal layer may have the thickness of 1 to 20 nm, the dielectric layer may have a thickness of 50 to 300 nm, and the first metal layer may have the thickness of 100 nm or more.

The first metal layer may be formed on a substrate, and the first metal layer may have a thickness smaller than that of the second metal layer.

The first metal layer may have the thickness of 1 to 20 nm, the dielectric layer may have a thickness of 50 to 300 nm, and the second metal layer may have the thickness of 100 nm or more.

Diameters of pores of the first pore pattern and the second pore pattern may be equal to or smaller than a diameter of the microlens.

Light absorbance characteristic of the multilayered aperture may be changed by varying a type of metal forming each metal layer, a thickness of each metal layer, and a thickness of the dielectric layer.

At least two or more multilayered apertures may be stacked to form a multilayer structure, and a transparent layer may be disposed between the respective multilayered apertures, and each multilayered aperture may include a first metal layer having a first pore pattern, a dielectric layer disposed on the first metal layer, and a second metal layer disposed on the dielectric layer and having a second pore pattern aligned with the first pore pattern in a row.

The microlens array may include a plurality of microlenses provided on each pore of the second metal layer of the uppermost multilayered aperture among the multilayered apertures.

In each multilayered aperture among the multilayered apertures, diameters of the pores of the first pore pattern of each multilayered aperture and diameters of the pores of the second pore pattern may be the same, and diameters of the pores of the first pore pattern and the second pore pattern of one multilayered aperture of the multilayered apertures may be different from diameters of the pores of a first pore pattern and a second pore pattern of the other multilayered aperture.

The transparent layer may have a thickness of 1 to 100 μm.

In another general aspect, a manufacturing method of a lens structure includes forming a multilayered aperture having a form of a metal layer-dielectric layer-metal layer stacked in a vertical direction and having pore patterns formed on both metal layers; and forming a microlens array provided on one side surface of the multilayered aperture.

The forming of the multilayered aperture may include forming a first metal layer having a first pore pattern on a substrate by forming a photoresist (PR) pattern on the substrate, depositing a first metal on the substrate and the PR pattern on the substrate, and then developing a PR on the substrate; forming a dielectric layer on the first metal layer by depositing a dielectric on the first metal layer; and forming a second metal layer having a second pore pattern aligned with the first pore pattern in a row on the dielectric layer by forming a PR pattern aligned with the first pore pattern of the first metal layer in a row on the dielectric layer, depositing a second metal on the dielectric layer and the PR pattern on the dielectric layer, and then developing a PR on the dielectric layer.

In the forming of the first metal layer and the forming of the second metal layer, the PR pattern on the substrate and the PR pattern on the dielectric layer may be formed through a lift-off process after a negative PR is coated.

The forming of the microlens array may include forming a microlens on each pore of the second metal layer.

In the forming of the microlens array, the microlens array may be formed by coating a PR for a microlens on each pore of the second metal layer to expose and develop the pattern, performing a hydrophobic coating treatment, and then performing a thermal reflow.

The hydrophobic coating treatment may be a hydrophobic coating containing fluorocarbon.

The manufacturing method may further include alternately stacking a multilayered aperture and a transparent layer by forming two or more multilayered apertures by repeating the forming of the multilayered aperture at least twice or more, and forming the transparent layer between the respective multilayered apertures; and forming a microlens array on the uppermost multilayered aperture among the multilayered apertures, wherein in the forming of the multilayered aperture, a first metal layer having a pore pattern is formed on a substrate or the transparent layer, a dielectric layer is formed on the first metal layer, and a second metal layer having a pore pattern aligned with the pore pattern of the first metal layer in a row is formed on the dielectric layer.

BRIEF DESCRIPTION OF THE DRAWINGS

FIGS. 9A to 9F illustrate SEM images and optical lens characteristics of the lens structure of the present invention;

FIGS. 11A to 11D illustrate light absorbance of incident light in an NIR region of a multilayered aperture according to changes in a type of a metal, a thickness of a metal layer, and a thickness of a dielectric layer in the lens structure of the present invention;

FIGS. 13A to 13D illustrate a comparison of images and modulation transfer functions (MTFs) of the microlens arrays with and without the multilayered aperture according to the present invention.

DETAILED DESCRIPTION OF EMBODIMENTS

Hereinafter, the present invention will be described in detail with reference to the accompanying drawings.

Figure 1:
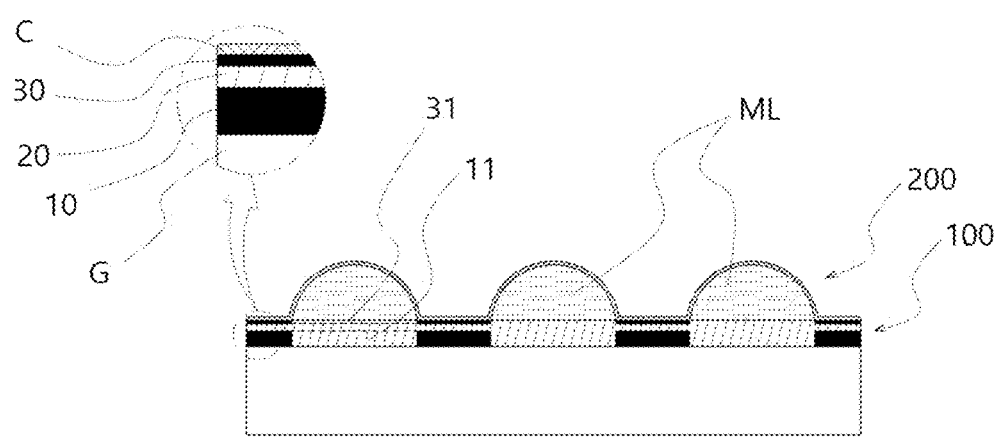
FIG. 1 is a side cross-sectional view of a lens structure according to an embodiment of the present invention.
Figure 2:
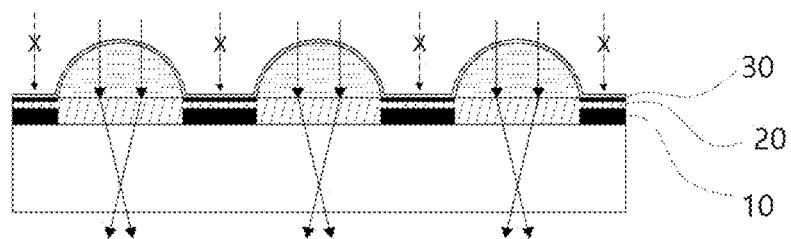
FIG. 2 illustrates incident light incident on the lens structure of FIG. 1 together.

FIG. 1 illustrates a side cross section of a lens structure according to an embodiment of the present invention, and FIG. 2 illustrates incident light incident on the lens structure of FIG. 1 together.

As illustrated in FIG. 1, a lens structure of the present invention includes a multilayered aperture 100 and a microlens array 200, in which the multilayered aperture 100 has a form of a metal layer-dielectric layer-metal layer stacked in a vertical direction and has pore patterns 11 and 31 formed on both metal layers, and the microlens array 200 is provided on one side surface of the multilayered aperture 100.

That is, the present invention relates to a lens structure including the multilayered aperture in which the pore patterns are formed on both metal layers of the thin film multilayered aperture formed of the metal layer-dielectric layer-metal layer and the corresponding pore corresponds to each lens of the microlens array, and more particularly, to a lens structure capable of reducing optical crosstalk of the microlens array by passing light passing through the lens through the pores formed in both metal layers and blocking light passing between the lens and the lens.

More specifically, as illustrated in FIG. 1, the multilayered aperture 100 includes a first metal layer 10 having a first pore pattern 11, a dielectric layer 20 disposed on the first metal layer 10, and a second metal layer 30 disposed on the dielectric layer 20 and having a second pore pattern 31 aligned with the first pore pattern 11 in a row.

The first metal layer 10 is disposed on a substrate G, and the first pore pattern 11 is formed on the first metal layer 10. Each pore has a circular shape, and a spacing between the pores in longitudinal and lateral directions is the same, so that the pore pattern 11 may be formed in a matrix shape. Here, the substrate G may be glass.

The dielectric layer 20 is disposed on the first metal layer 10, and the type of dielectric may be made of any one of photoresist, silicon (Si), germanium (Ge), gallium arsenide (GaAs), iron oxide ($Fe_xO_y$), silicon oxide, silicon nitride, titanium oxide, and titanium nitride, or a combination thereof.

The second metal layer 30 is disposed on the dielectric layer 20, and the second pore pattern 31 aligned with the first pore pattern 11 of the first metal layer 10 in a row is formed on the second metal layer 30. That is, the center of each pore of the second metal layer 30 may be located on the same line vertically as the center of each pore of the first metal layer 10. This is to allow light passing through a lens ML in the lens structure of the present invention to pass through the multilayered aperture 100, and each pore of the first metal layer 10 and each pore of the second metal layer 30 are optically communicated to act as an aperture in the multilayered aperture 100.

Although a diameter of the pores of the first metal layer 10 and a diameter of the pores of the second metal layer 30 do not necessarily have to be the same, it is preferable to form the pores of both metal layers 10 and 30 to have the same diameter in consideration of a manufacturing convenience and a function of a light absorbing layer of the multilayered aperture 100 to be described later.

The type of metal forming the first metal layer 10 and the second metal layer 30 may be any one of gold, silver, copper, chromium, aluminum, and platinum or a combination thereof, and in this case, the type of the metal forming the first metal layer 10 and the type of the metal forming the second metal layer 30 may be the same or different from each other.

The microlens array 200 is formed to include a plurality of microlenses ML provided on each pore of the second metal layer 30, and a shape in which the plurality of microlenses ML are arranged to form an array may be formed in the same shape as the pore pattern 31 of the second metal layer 30. The diameter of the microlens ML is preferably greater than or at least equal to the diameter of the pores of the second metal layer 30 from a viewpoint of focusing light, and the diameter of the pores of the second metal layer 30 may be 10 to 500 µm. Meanwhile, a coating layer C may be further formed by thermal reflow on the uppermost side of the lens structure, that is, on each lens ML and on the second metal layer 30 between the respective lenses MLs. The coating layer C will be described in more detail in a manufacturing method of a lens structure of the present invention to be described later.

As described above, the lens structure of the present invention may remarkably reduce optical crosstalk occurring in the microlens array by transmitting the light that passes through each lens and blocking all light that passes around the lens, that is, between the lens and the lens, as the multilayered aperture formed of the first metal layer—the dielectric layer—the second metal layer is provided on the microlens array.

In this case, the multilayered aperture 100 made of the metal layer-dielectric layer-metal layer blocks light incident around each lens ML from passing through the multilayered aperture 100, and may not block the light by reflecting the light, but may block the light by allowing the multilayered aperture 100 to absorb the light.

More specifically, as illustrated in FIG. 1, the first metal layer 10 may be formed on the substrate G, the second metal layer 30 may be formed on the dielectric layer on the first metal layer 10, and in this case, a thickness of the second metal layer 30 may be thinner than a thickness of the first metal layer 10. Accordingly, as illustrated in FIG. 2, light incident on the lens structure first meets the second metal layer 30. In this case, since the second metal layer 30 is formed to have a very thin thickness, the light is transmitted through the second metal layer 30, the light transmitted through the second metal layer 30 is reflected by the first metal layer 10 formed to have a thick thickness, and the light reflected from the first metal layer 10 meets light incident on the first metal layer 10 and disappears due to destructive interference. As such, in the lens structure of the present invention, the multilayered aperture 100 functions as a light absorbing layer that absorbs light, and accordingly, light incident between the respective lenses MLs other than the light passing through the lenses MLs is absorbed by the multilayered aperture 100, thereby further reducing optical crosstalk of the microlens array 200.

In this case, it is preferable that the thickness of the dielectric layer 20 is formed to correspond to ¼n of a wavelength of the incident light. n corresponds to a refractive index of the dielectric layer 20. This is to make an optical path difference between the light incident on the second metal layer 30 and the light reflected from the first metal layer 10 by ¼ wavelength, and since the light reflected from the first metal layer 10 has a phase opposite to that of the light incident on the second metal layer 30, the two lights are extinguished due to destructive interference when the optical paths of the two lights differ by ¼ wavelength, so that a light absorbance of the multilayered aperture 100 may be further increased.

Figure 3A:
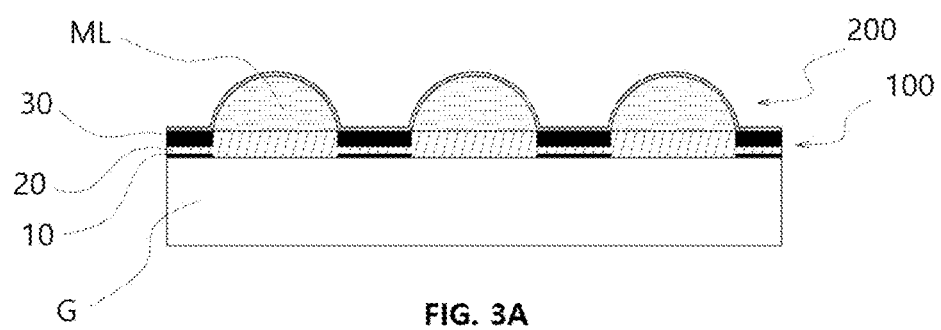
FIGS. 3A and 3B are side cross-sectional views of a lens structure according to another embodiment of the present invention.
Figure 3B:
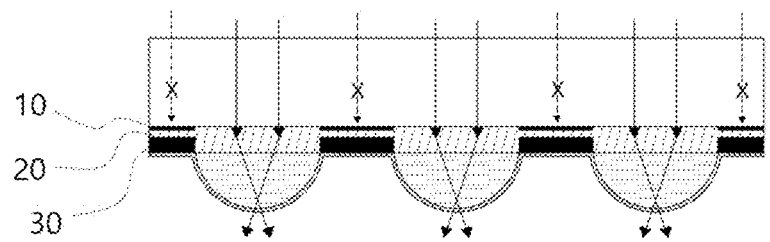

FIGS. 3A and 3B illustrate side cross-sectional views of a lens structure according to another embodiment of the present invention. The lens structure of FIG. 3A has the same basic configuration as the lens structure of FIG. 1, but there is a difference in that the lens structure of FIG. 1 is provided so that the light first passes through the lens ML and then passes through the substrate G as illustrated in FIG. 2 while the lens structure of FIG. 3A is provided so that the light first passes through the substrate G and then passes through the lens ML as illustrated in FIG. 3B.

That is, the lens structure of FIGS. 3A and 3B has a structure in which the lens structure of FIG. 1 is inverted, and in the lens structure of FIGS. 3A and 3B, the first metal layer 10 may be formed on the substrate G, and the second metal layer 30 may be formed on the dielectric layer 20 on the first metal layer 10, in which a thickness of the first metal layer 10 may be thinner than a thickness of the second metal layer 30. Accordingly, the light incident on the lens structure first passes through the substrate G, and then passes through the first metal layer 10 by first meeting the first metal layer 10 formed to have the thin thickness as described above, the light transmitted through the first metal layer 10 is reflected from the second metal layer 30 formed to have the thick thickness, and the light reflected from the second metal layer 30 is canceled by the light incident on the first metal layer 10, so that the multilayered aperture 100 may function as a light absorbing layer. The lens structure of FIG. 1 and the lens structure of FIGS. 3A and 3B may be appropriately selected corresponding to a mounting structure of an optical mechanism or device to which the lens structure is mounted.

The lens structure of the present invention as described above may be formed very thinly because all of the first metal layer 10, the dielectric layer 20, and the second metal layer 30 are made of a thin film, the thickness of any one of the metal layers may be 1 to 20 nm, the thickness of the dielectric layer 20 may be 50 to 300 nm, and the thickness of the other metal layer 30 may be 100 nm or more. Accordingly, since the microlens array 200 has an ultra-thin multilayered aperture 100, a size of the lens structure may be significantly reduced.

Figure 4A:
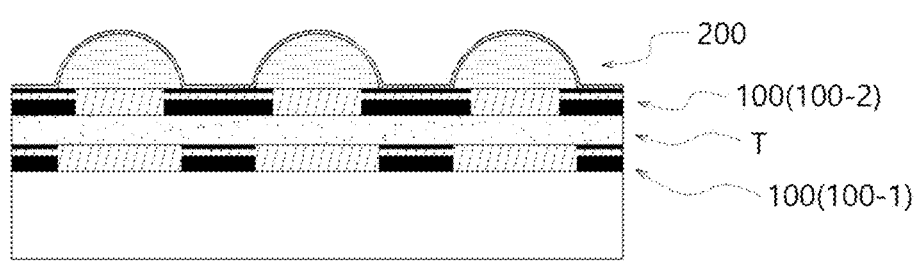
FIGS. 4A and 4B are side cross-sectional views of a lens structure according to still another embodiment of the present invention.
Figure 4B:
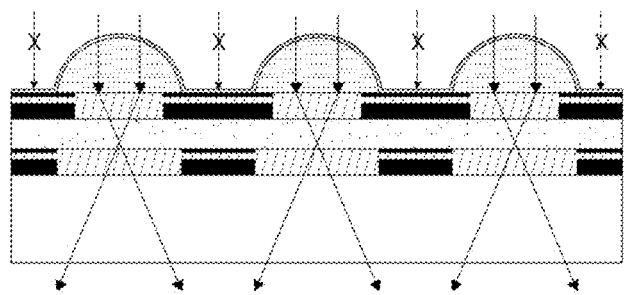

FIGS. 4A and 4B illustrate side cross-sectional views of a lens structure according to still another embodiment of the present invention. The lens structure of FIGS. 4A and 4B is a lens structure of a multilayer structure in which at least two or more multilayered apertures 100 are stacked. More specifically, at least two or more multilayered apertures 100 made of the above-described metal layer-dielectric layer-metal layer are stacked to form a multilayer structure, in which a transparent layer T may be disposed between the respective multilayered apertures, and the microlens array 200 may be disposed on the uppermost multilayered aperture 100. In this case, the microlens array 200 may include a plurality of microlenses MLs provided on each pore of the second metal layer 30 of the uppermost multilayered aperture 100.

The transparent layer T is to perform a spacer function to space the two adjacent multilayered apertures 100, and may be formed of a material that transmits light, for example, any one of photoresist, silicon (Si), germanium (Ge), gallium arsenide (GaAs), iron oxide ($Fe_xO_y$), silicon oxide, titanium oxide, and titanium nitride, or a combination thereof. In addition, a thickness of the transparent layer T may be 1 to 100 μm.

In this case, in each multilayered aperture 100 among the multilayered apertures, diameters of the pores of the first pore pattern 11 and diameters of the pores of the second pore pattern 31 of each multilayered aperture 100 may be the same. Furthermore, diameters of the pores of the first pore pattern 11 and the second pore pattern 31 of one multilayered aperture 100 of the multilayered apertures may be different from diameters of the pores of a first pore pattern 31' and a second pore pattern 32' of the other multilayered aperture 100'.

A lens structure illustrated in FIG. 4A will be described as an example. The lens structure includes a lower multilayered aperture 100-1 and an upper multilayered aperture 100-2, a transparent layer T is disposed therebetween, and a microlens array 200 is provided on the upper multilayered aperture 100-2. Here, the diameters of the pores of the first and second metal layers of the lower multilayered aperture 100-1 may be formed to be the same, and separately, the diameters of the pores of the first and second metal layers of the upper multilayered aperture 100-2 may be formed to be the same. That is, for example, the diameters of the pores of the first and second metal layers of the lower multilayered aperture 100-1 are all about 100 μm, and the diameters of the pores of the first and second metal layers of the upper multilayered aperture 100-2 are all about 200 μm.

In this case, the diameters of the pores of the first and second metal layers of the lower multilayered aperture 100-1 and the diameters of the pores of the first and second metal layers of the upper multilayered aperture 100-2 may be formed to be the same, or as in the above example, the diameters of the pores of the first and second metal layers of the lower multilayered aperture 100-1 and the diameters of the pores of the first and second metal layers of the upper multilayered aperture 100-2 may also be formed to be different from each other. This is to adjust the amount of light entering the lens ML and at the same time to adjust a wide field-of-view by forming the diameters of the pores of each multilayered aperture 100 to be different. As illustrated in FIG. 4B, as the diameters of the pores of the upper multilayered aperture 100-2 and the lower multilayered aperture 100-1 are formed to be different from each other, the wide field-of-view of the lens ML may be adjusted.

As such, as two or more multilayered apertures are provided, the light absorbance is further increased by the multilayered apertures and accordingly, the optical crosstalk of the microlens array may be reduced, and by forming the diameters of the pores of each multilayered aperture to be different while maintaining the diameter of the lens to be the same, the field-of-view of the lens may be adjusted, and further, the amount of light and the F-number may also be adjusted.

In addition, as the transparent layer disposed between the respective multilayered apertures is configured as a polarizing filter, a spectral filter, and/or a daylight filter, optical properties of the lens structure may be additionally provided.

On the other hand, although not illustrated, the multilayered aperture with the multilayer structure may also be used with an inverted structure, that is, by allowing the light passing through the lens to first pass through the substrate and then through the lens later. In this case, each multilayered aperture may be formed so that the thickness of the first metal layer is thinner than the thickness of the second metal layer.

Hereinafter, a manufacturing method of a lens structure according to the present invention will be described. First, the manufacturing method of a lens structure according to the present invention includes a step of forming a multilayered aperture having a form of a metal layer-dielectric layer-metal layer stacked in a vertical direction and having pore patterns formed on both metal layers, and a step of forming a microlens array provided on one side surface of the multilayered aperture.

Figure 5:
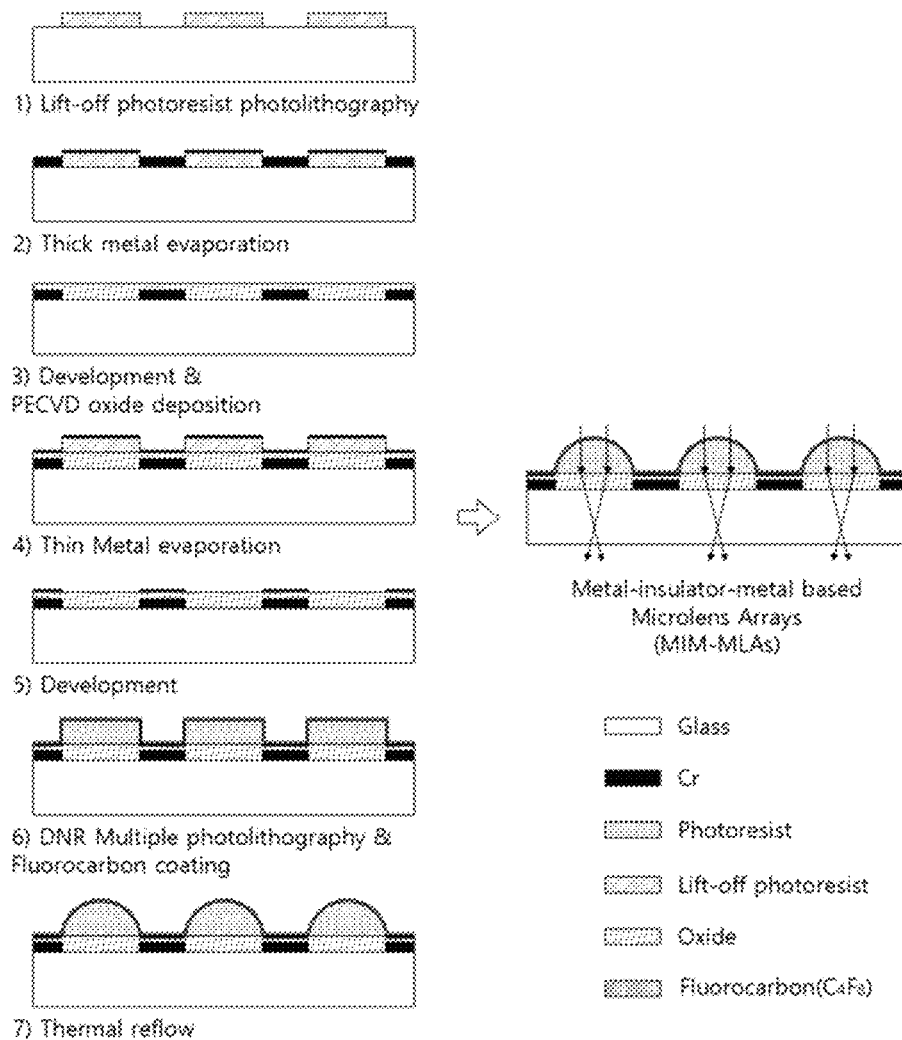
FIG. 5 is a manufacturing method of a lens structure according to an embodiment of the present invention.

FIG. 5 illustrates a manufacturing method of a lens structure MIM-MLAs according to an embodiment of the present invention. Referring to FIG. 5 in more detail, a multilayered aperture may be formed through a step of forming a first metal layer having a first pore pattern on a substrate by forming a photoresist (PR) pattern on the substrate, depositing a first metal on the substrate and the PR pattern, and then developing a PR, a step of forming a dielectric layer by depositing a dielectric on the first metal layer, and a step of forming a second metal layer having a second pore pattern aligned with the first pore pattern in a row by forming a PR pattern aligned with the first pore pattern of the first metal layer in a row on the dielectric layer, depositing a second metal on the dielectric layer and the PR pattern, and then developing a PR, and a microlens array may be formed by forming a microlens on each pore of the second metal layer. In this case, the substrate may be a glass substrate, and it is preferable to perform cleaning of the substrate using a sulfuric acid-hydrogen peroxide solution prior to manufacturing the lens structure.

Here, when depositing the dielectric on the first metal layer, the dielectric is also deposited on the substrate corresponding to each pore of the first metal layer by depositing the dielectric over an upper portion of the first metal layer as illustrated in 3) of FIG. 5, and accordingly, the dielectric layer may be formed on the first metal layer by filling each pore of the first metal layer with the dielectric.

In the steps of forming the first metal layer and the second metal layer, when depositing the first and second metals, the metal may be deposited in the form of a film or nano-particle (nano-island, nano-hole, and nano-sphere) in consideration of wavelength characteristics according to the type of the metal. In addition, in the step of forming the first metal layer and the step of forming the second metal layer, the PR patterns may be formed through a lift-off process of exposing and developing the patterns using a photomask after a negative PR is spin-coated on the substrate or the dielectric layer. Through the lift-off process using the negative PR, the PR may be completely removed from the substrate due to high-temperature conditions during dielectric deposition.

In the step of forming the microlens array, the microlens array may be formed by coating a PR for a microlens on each pore of the second metal layer to expose and develop the pattern, performing a hydrophobic coating treatment, and then performing a thermal reflow. When forming the PR for the microlens on each pore of the second metal layer, as in the case of depositing the dielectric on the first metal layer, the PR for the microlens is also formed on the dielectric layer corresponding to each pore of the second metal layer, and accordingly, the PR for the microlens may be formed on each pore of the second metal layer by filling each pore of the second metal layer with the PR for the microlens. Therefore, a pattern of the PR for the microlens formed on each pore of the second metal layer may be formed in the same shape as the second pore pattern of the second metal layer, and the microlenses may be aligned in the same pattern as the second pore pattern to form an array.

Furthermore, the hydrophobic coating performed after developing the PR for the microlens may be a hydrophobic coating containing fluorocarbon. The hydrophobic coating is performed prior to the performing of the thermal reflow, and accordingly, the coating layer C may be further formed on each lens and on the second metal layer between the respective lenses. More specifically, when the PR for the microlens is deposited on the substrate, surface energy is lowered. In this state, when the thermal reflow is performed, the same diameter is not maintained and lateral expansion occurs, which makes it difficult to obtain a spherical microlens shape by increasing the diameter. On the other hand, according to the present invention, by increasing the surface energy of the substrate through the hydrophobic coating to prevent the lateral expansion of the PR for the microlens, the spherical microlens is well formed at the time of performing the thermal reflow. That is, according to the present invention, by performing the hydrophobic coating treatment prior to the thermal reflow of the PR for the microlens, it is possible to prevent a swelling of the PR for the microlens occurring in the thermal reflow process, and to precisely adjust a numerical aperture of the microlens.

As described above, according to the manufacturing method of the lens structure of the present invention, since the lens structure is manufactured by using the substrate used for manufacturing the lens structure as it is, there is no need for an additional substrate other than the lens structure of the present invention, and furthermore, the multilayered aperture may be manufactured with a large area, and the thicknesses of the metal layer and the dielectric layer may be adjusted when manufacturing the multilayered aperture, so that the multilayered aperture corresponding to an optimal wavelength of incident light incident on the lens structure may be manufactured as described later. In addition, since the lens structure is formed through the large-area photolithography and thermal reflow, the lens structure may be manufactured regardless of temperature and humidity changes in the processes of depositing the metal and the dielectric.

Figure 6:
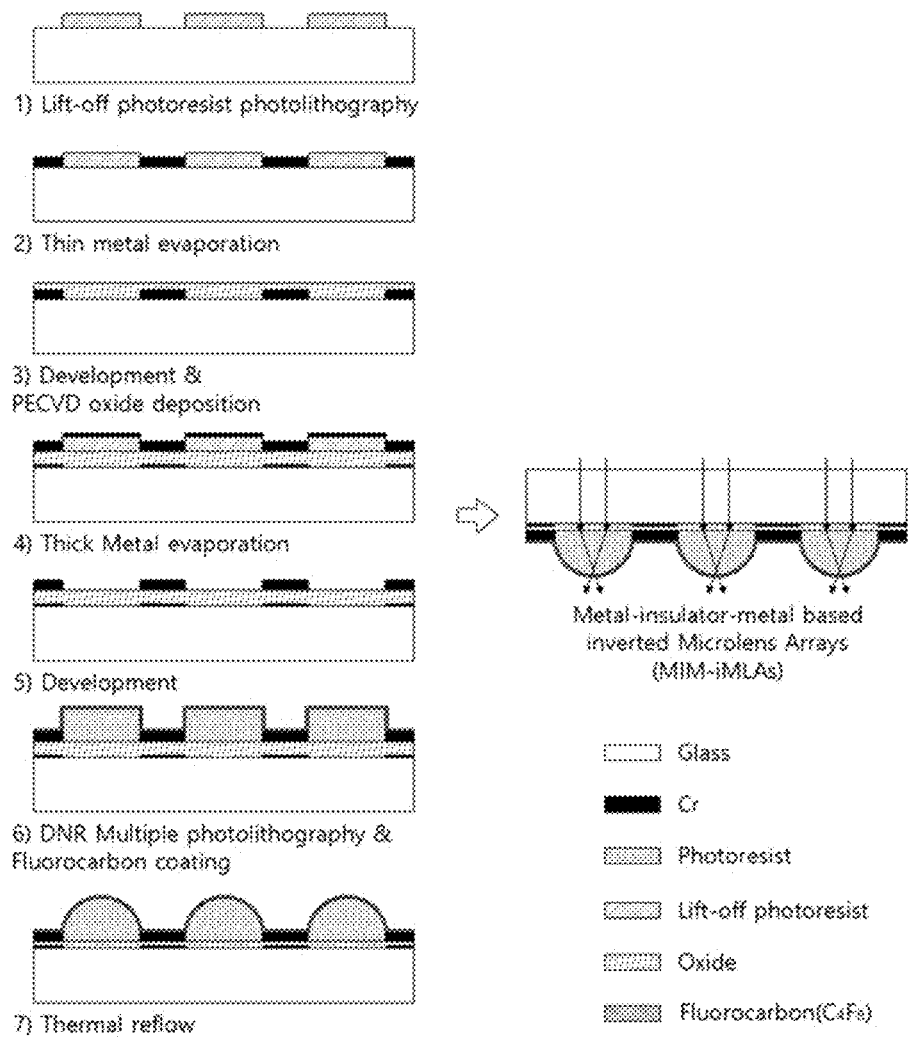
FIG. 6 is a manufacturing method of a lens structure according to another embodiment of the present invention.

FIG. 6 is a cross-sectional view illustrating a manufacturing method of a lens structure MIM-iMLAs according to another embodiment of the present invention, which corresponds to a manufacturing method of the lens structure having the inverted structure of FIGS. 3A and 3B described above, and illustrates a manufacturing method of a lens structure having an inverted structure. Such a method is basically the same as the manufacturing method described with reference to FIG. 5, except that the first metal layer is formed to have a thin thickness and the second metal layer is formed to have a thick thickness.

Figure 7:
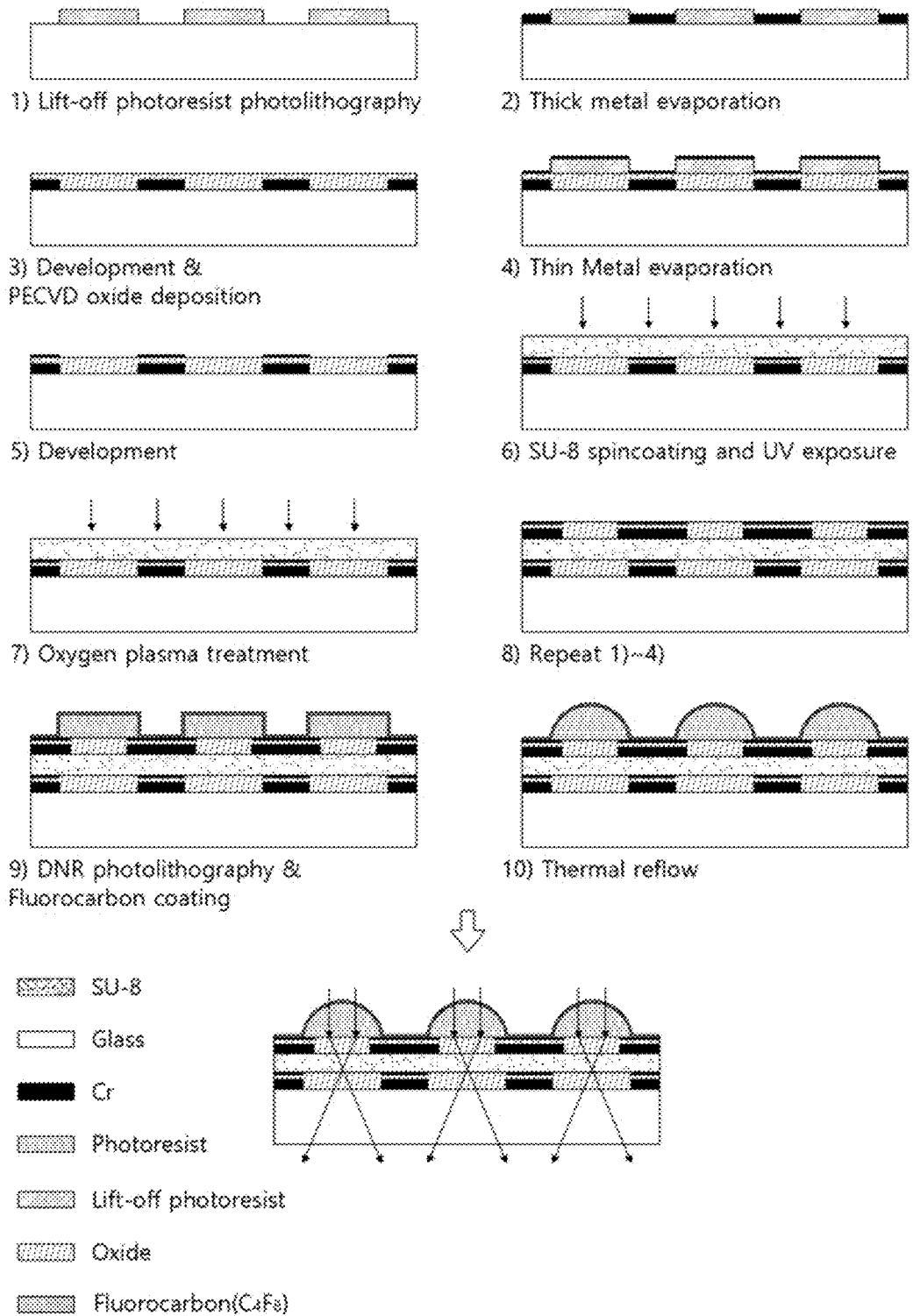
FIG. 7 is a manufacturing method of a lens structure according to still another embodiment of the present invention.

FIG. 7 is a cross-sectional view illustrating a manufacturing method of a lens structure MIM-iMLAs according to another embodiment of the present invention, and illustrates a manufacturing method of a lens structure of a multilayer structure having a plurality of multilayered apertures of FIGS. 4A and 4B described above.

More specifically, the lens structure of the multilayer structure may be formed through a step of alternately stacking a multilayered aperture and a transparent layer by forming two or more multilayered apertures by repeating the step of forming the above-described multilayered aperture at least twice or more, and forming the transparent layer between the respective multilayered apertures, and a step of forming a microlens array on an uppermost multilayered aperture among the multilayered apertures. Here, the step of forming each multilayered aperture is the same as described above, but it is different in that the lowermost multilayered aperture is formed on the substrate, but the subsequent multilayered apertures are stacked on the transparent layer.

In this case, the transparent layer may be formed by depositing or applying a transparent material on the multilayered aperture, coating the transparent material, and exposing the transparent material, and may be formed, for example, by spin coating SU-8 series PR on the multilayered aperture.

As described above, according to the manufacturing method of the lens structure of the multilayer structure of the present invention, the amount of light, the wide field-of-view, and the F-number of the microlens may be easily adjusted by adjusting the diameters of the pores of each multilayered aperture at the time of manufacturing the lens structure, and furthermore, it is also easy to further provide additional optical properties of the lens by inserting the transparent layer in the form of a polarizing filter, a spectral filter, and/or a daylight filter.

Hereinafter, experimental results regarding the lens structure of the present invention will be described.

Figure 8A:
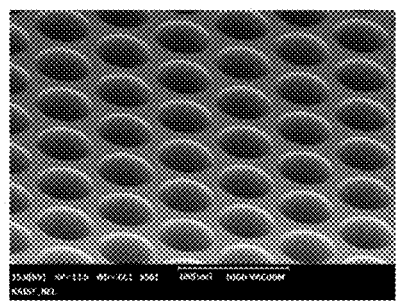
FIGS. 8A to 8D are SEM images of a lens structure manufactured through the manufacturing method of the present invention.
Figure 8B:
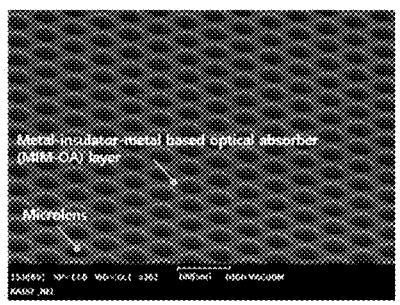
Figure 8C:
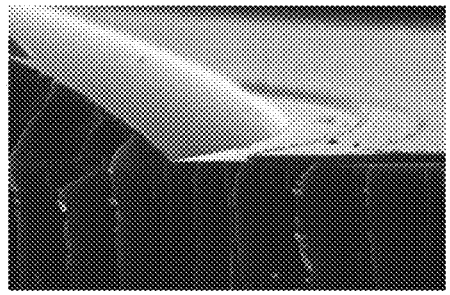
Figure 8D:
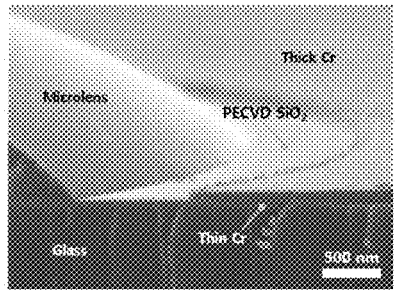

FIGS. 8A to 8D are SEM images of the lens structure manufactured through the manufacturing method of the present invention. FIGS. 8A and 8B illustrate the lens structure viewed from the top, where it may be seen that each microlens is well aligned in the same pattern on the multilayered aperture to form an array. In addition, FIGS. 8C and 8D are enlarged cross-sectional views of the lens structure. In this case, FIG. 8D illustrates that pseudo color is applied to the lens structure of FIG. 8C, where it may be seen that a thin first metal layer (Thin Cr), a dielectric layer (PECVD SiO2), and a thick second metal layer (Thick Cr) are well stacked on the substrate (glass).

FIGS. 9A to 9F illustrate SEM images and optical lens characteristics of the lens structure of the present invention, where FIG. 9A illustrates a planar image of a lens structure having an aperture formed only with a thick metal layer, FIG. 9B illustrates an upper image of the lens structure of FIG. 1 described above, and FIG. 9C illustrates an upper image of the lens structure having the inverted structure of FIGS. 3A and 3B described above. In the case of FIG. 9A, in order to compare the experimental results with the present invention, the lens structure was manufactured by forming pore patterns on one thick metal layer and arranging microlens arrays thereon.

FIG. 9D illustrates an optical image of light passing through the lens structure of FIG. 9A, and FIG. 9E illustrates an optical image of light passing through the lens structure of FIG. 9B. As illustrated, in FIG. 9D, it may be seen that ambient light corresponding to noise other than light in the form of points that are focused through each lens is further transmitted between the lenses, whereas in FIG. 9E, it may be seen that the light is focused only through the lens, and all ambient light between the lens and the lens is blocked.

FIG. 9F illustrates the light intensity for AA' in FIG. 9D and BB' in FIG. 9E. As illustrated, according to the present invention, it may be seen that there is almost no ambient light other than the light focused by the lens, but in the case of the aperture formed only with the thick metal layer, it may be seen that the intensity of ambient light exists up to 43% compared to the focused light. As described above, when light leaks between the lens and the lens due to the structural characteristics of the microlens array, the contrast decreases and optical crosstalk occurs. However, according to the present invention, it may be seen that the multilayered aperture of the metal layer-dielectric layer-metal layer acts as the light absorbing layer to block the ambient light, thereby exhibiting high contrast and optical resolution.

Figure 10A:
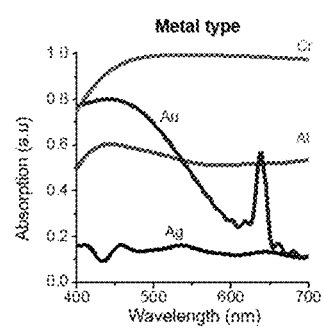
FIGS. 10A to 10D illustrate light absorbance of incident light in a visible region of a multilayered aperture according to changes in a type of a metal, a thickness of a metal layer, and a thickness of a dielectric layer in the lens structure of the present invention.
Figure 10B:
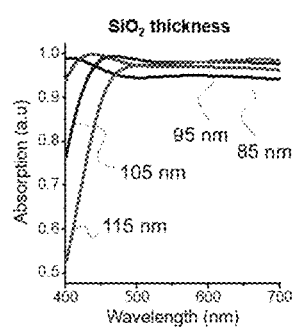
Figure 10C:
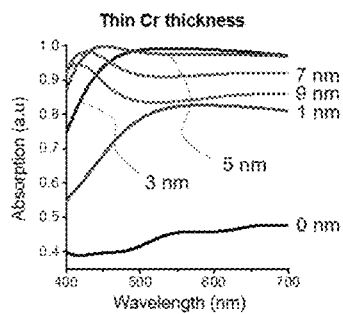
Figure 10D:
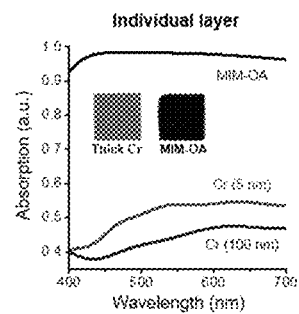

FIGS. 10A to 10D illustrate light absorbance of incident light in a visible region of a multilayered aperture according to changes in a type of a metal, a thickness of a metal layer, and a thickness of a dielectric layer in the lens structure of the present invention, where FIG. 10A illustrates the light absorbance according to the change in the type of a metal, FIG. 10B illustrates the light absorbance according to the change in the thickness of the dielectric layer, FIG. 10C illustrates the light absorbance according to the change in the thickness of a thin metal layer, and FIG. 10D illustrates a comparison of the light absorbance of the multilayered aperture and the aperture formed with only one metal layer.

It may be seen in FIG. 10A that Cr exhibits the best light absorbance in incident light in a visible ray region (400 to 700 nm), it may be seen in FIG. 10B that the best light absorbance is exhibited when the thickness of the dielectric layer (SiO2) is 95 nm, and it may be seen in FIG. 10C that the best light absorbance is exhibited when the thickness of the thin Cr metal layer is 6 nm. As described above, as the type of the metal forming each metal layer, the thickness of each metal layer, and the thickness of the dielectric layer are varied, it may be seen that the light absorption characteristic of the multilayered aperture is changed. In addition, it may be seen in FIG. 10D that the aperture formed with the metal layer-dielectric layer-metal layer (MIM-OA) exhibits an overwhelmingly high light absorbance compared to the aperture formed only with the thin metal layer (Cr of 5 nm) or the aperture formed only with the thick metal layer (Cr of 100 nm).

FIGS. 11A to 11D illustrate light absorbance of incident light in an NIR region of a multilayered aperture according to changes in a type of a metal, a thickness of a metal layer, and a thickness of a dielectric layer in the lens structure of the present invention, where FIGS. 11A to 11D illustrate the same as those of FIGS. 10A to 11D described above.

It may be seen in FIG. 11A that Cr-Ox-Cr exhibits the best light absorbance in incident light in a near-infrared region (700 to 1000 nm), it may be seen in FIG. 11B that the best light absorption rate is exhibited when the thickness of the dielectric layer (Oxide) is 135 nm, and it may be seen in FIG. 11C that the best light absorption rate is exhibited when the thickness of Cr is 6 nm. Furthermore, it may be similarly seen in FIG. 11D that the aperture formed with the metal layer-dielectric layer-metal layer (MIM-OA) exhibits an overwhelmingly high light absorbance compared to the apertures of Cr of 5 nm and Cr of 100 nm of the single layer.

As described above, as the type of the metal, the thickness of the metal layer, and the thickness of the dielectric layer are varied, the light absorbance characteristics of the multilayered aperture are changed, and therefore, according to the present invention, by controlling these factors, it is possible to design a multilayered aperture corresponding to an optimal wavelength of light incident on the lens structure. On the other hand, those exhibiting the best light absorbance described above are the most excellent conditions in the corresponding conditions, and may be varied as the corresponding conditions, that is, the wavelength of the incident light, the type of the metal, the thicknesses of the metal layer and the dielectric layer, and the like are changed.

Figure 12A:
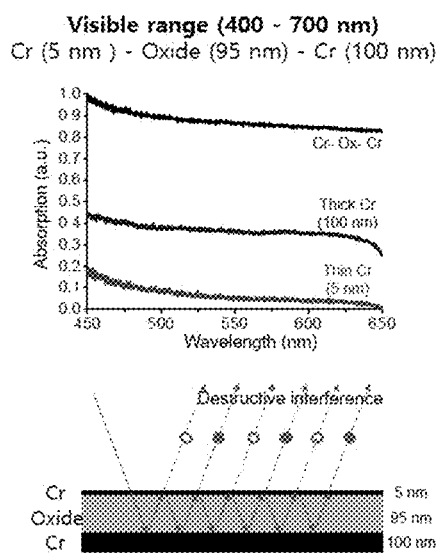
FIGS. 12A and 12B illustrate optical spectra of the lens structure of the present invention.
Figure 12B:
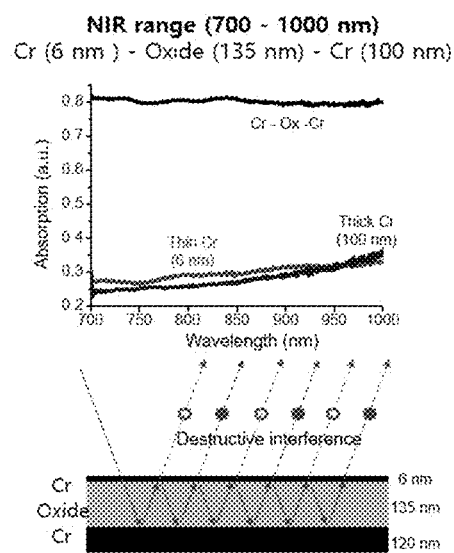

FIGS. 12A and 12B illustrate optical spectra of the lens structure of the present invention, where FIG. 12A illustrates a light absorbance of the multilayered aperture of Cr (5 nm)-Oxide (95 nm)-Cr (100 nm) in the visible light region, and FIG. 12B illustrates a light absorbance of the multilayered aperture of Cr (6 nm)-Oxide (135 nm)-Cr (100 nm) in the near-infrared region. In this case, it may be seen in both FIGS. 12A and 12B that the multilayered apertures exhibit the highest light absorbance when the thickness of each dielectric layer is ¼n of the wavelength of incident light. n corresponds to a refractive index of the dielectric layer.

FIGS. 13A to 13D illustrate a comparison of images and modulation transfer functions (MTFs) of the microlens arrays with and without the multilayered aperture according to the present invention, where FIG. 13A illustrates an image (left) of the microlens array without the multilayered aperture (MLAs w/o MIM-OA) and an image (right) of the microlens array with the multilayered aperture (MIN-MLAs), FIG. 13B is an enlarged view of FIG. 13A, FIG. 13C illustrates a comparison of the MTFs of the microlens array with the multilayered aperture and the microlens array without the multilayered aperture, and FIG. 13D illustrates a comparison of the intensities of AA' and BB' in FIG. 13B.

As illustrated in FIGS. 13A and 13B, it may be seen that the microlens array with the multilayered aperture according to the present invention has a clear image, compared to the case of the microlens array without the multilayered aperture, in which the image is blurred. As illustrated in FIG. 13C, in the case of the present invention, it may be seen that the optical resolution of the MTF is about 75 cycles/mm, which is higher than that of the microlens array without the multilayered aperture of about 60 cycles/mm. As illustrated in FIG. 13D, it may be seen that while the intensity of the present invention is between about 30 and 230, the intensity of the microlens array without the multilayered aperture is between about 120 and 180. As described above, in the case of the microlens array provided with the multilayered aperture of the present invention, it may be seen that a clear image may be obtained by having greater contrast.

According to the lens structure of the present invention, as the multilayered aperture of the form of the metal layer-dielectric layer-metal layer performs the function of the light absorption layer, the optical crosstalk of the microlens array may be significantly reduced, and contrast and optical resolution of an image obtained by using the present lens structure may be improved, and further, as a plurality of multilayered apertures are provided, the field-of-view and F-number of the microlens may be easily adjusted.

In addition, according to the manufacturing method of the lens structure of the present invention, the multilayered aperture may be manufactured with a large area during the manufacturing process, the multilayered aperture corresponding to the optimum wavelength range band of the incident light may be designed by adjusting the type of metal, and the thicknesses of the thin film and the dielectric during manufacturing to change the light absorbance characteristics of the multilayered aperture, and further, as the metal layer-dielectric layer-metal layer is manufactured as an ultra-thin film, the overall size of the lens structure may be significantly reduced.

Hereinabove, although the embodiments of the present invention have been described with reference to the accompanying drawings, those skilled in the art to which the present invention pertains will understand that the present invention may be embodied in other specific forms without changing the technical spirit or essential features thereof. Therefore, it should be understood that the embodiments described above are illustrative in all respects and not restrictive.

DETAILED DESCRIPTION OF MAIN ELEMENTS

100: multilayered aperture
200: microlens array

10: first metal layer
11: first pore pattern
20: dielectric layer
30: second metal layer
31: second pore pattern
100-1: lower multilayered aperture
100-2: upper multilayered aperture
ML: microlens
T: transparent layer
G: substrate
C: coating layer

What is claimed is:

1. A lens structure comprising:
a multilayered aperture having a form of a metal layer-dielectric layer-metal layer stacked in a vertical direction and having pore patterns formed on both metal layers; and
a microlens array provided on one side surface of the multilayered aperture,
wherein the multilayered aperture includes:
a first metal layer having a first pore pattern;
a dielectric layer disposed on the first metal layer; and
a second metal layer disposed on the dielectric layer and having a second pore pattern aligned with the first pore pattern in a row,
wherein the microlens array is formed to include a plurality of microlenses provided on each pore of the second metal layer,
wherein
the first metal layer is formed on a substrate, and
the first metal layer has a thickness smaller than that of the second metal layer, and
wherein
the first metal layer has the thickness of 1 to 20 nm,
the dielectric layer has a thickness of 50 to 300 nm, and
the second metal layer has the thickness of 100 nm or more.

2. The lens structure of claim 1, wherein diameters of pores of the first pore pattern and the second pore pattern are equal to or smaller than a diameter of the microlens.

3. The lens structure of claim 1, wherein light absorbance characteristic of the multilayered aperture is changed by varying a type of metal forming each metal layer, a thickness of each metal layer, and a thickness of the dielectric layer.

4. The lens structure of claim 1, wherein at least two or more multilayered apertures are stacked to form a multilayer structure, and a transparent layer is disposed between the respective multilayered apertures, and
each multilayered aperture includes a first metal layer having a first pore pattern, a dielectric layer disposed on the first metal layer, and a second metal layer disposed on the dielectric layer and having a second pore pattern aligned with the first pore pattern in a row.

5. The lens structure of claim 4, wherein the microlens array includes a plurality of microlenses provided on each pore of the second metal layer of the uppermost multilayered aperture among the multilayered apertures.

6. The lens structure of claim 4, wherein in each multilayered aperture among the multilayered apertures, diameters of the pores of the first pore pattern of each multilayered aperture and diameters of the pores of the second pore pattern are the same, and
diameters of the pores of the first pore pattern and the second pore pattern of one multilayered aperture of the multilayered apertures are different from diameters of the pores of a first pore pattern and a second pore pattern of the other multilayered aperture.

7. The lens structure of claim 4, wherein the transparent layer has a thickness of 1 to 100 μm.

8. A lens structure comprising:
a multilayered aperture having a form of a metal layer-dielectric layer-metal layer stacked in a vertical direction and having pore patterns formed on both metal layers; and
a microlens array provided on one side surface of the multilayered aperture,
wherein the multilayered aperture includes:
a first metal layer having a first pore pattern;
a dielectric layer disposed on the first metal layer; and
a second metal layer disposed on the dielectric layer and having a second pore pattern aligned with the first pore pattern in a row,
wherein the microlens array is formed to include a plurality of microlenses provided on each pore of the second metal layer,
wherein
the first metal layer is formed on a substrate, and
the second metal layer has a thickness smaller than that of the first metal layer.

9. The lens structure of claim 8, wherein the second metal layer has the thickness of 1 to 20 nm,
the dielectric layer has a thickness of 50 to 300 nm, and
the first metal layer has the thickness of 100 nm or more.

* * * * *